G. R. KIDDER.
AGRICULTURAL LAND-ROLLERS.

No. 194,603. Patented Aug. 28, 1877.

WITNESSES
Mary P. Utley.
Francis J. Masi

INVENTOR
George R. Kidder,
by E. W. Anderson.
ATTORNEY

N. PETERS, PHOTO-LITHOGRAPHER, WASHINGTON, D. C.

UNITED STATES PATENT OFFICE.

GEORGE R. KIDDER, OF ARMADA, MICHIGAN, ASSIGNOR OF TWO-THIRDS OF HIS RIGHT TO LEWIS GRANGER AND CHARLES W. MILLETT, OF SAME PLACE.

IMPROVEMENT IN AGRICULTURAL LAND-ROLLERS.

Specification forming part of Letters Patent No. 194,603, dated August 28, 1877; application filed June 23, 1877.

*To all whom it may concern:*

Be it known that I, GEORGE R. KIDDER, of Armada, in the county of Macomb and State of Michigan, have invented a new and valuable Improvement in Land-Rollers; and I do hereby declare that the following is a full, clear, and exact description of the construction and operation of the same, reference being had to the annexed drawings, making a part of this specification, and to the letters and figures of reference marked thereon.

Figure 1:
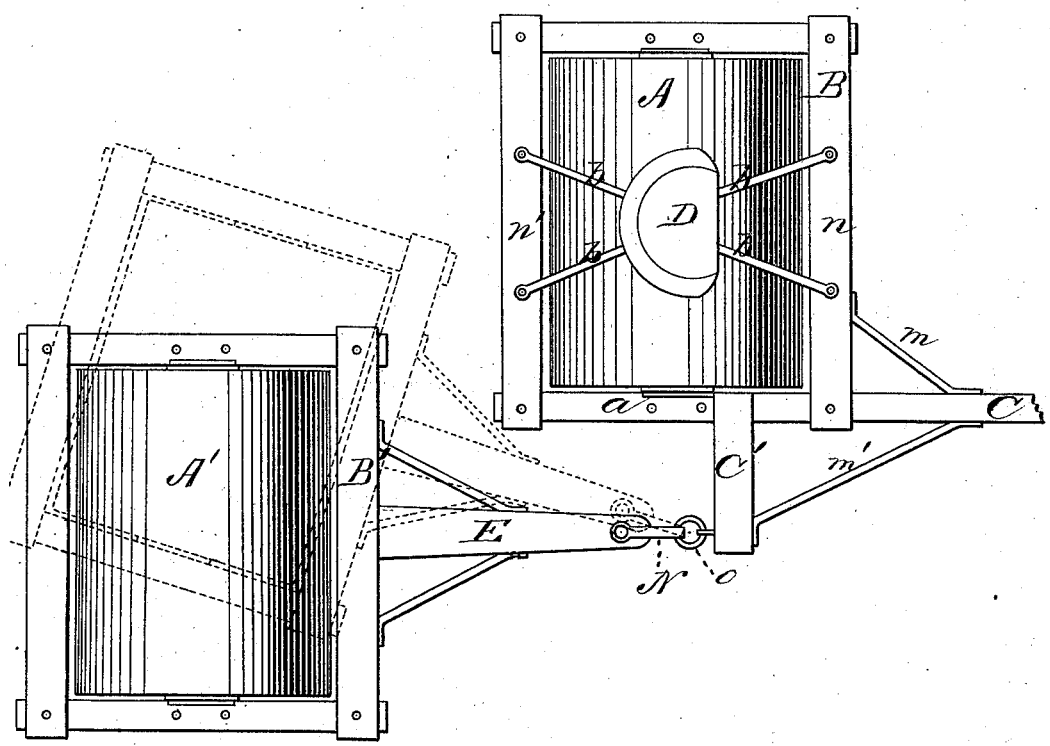
Figure 2:
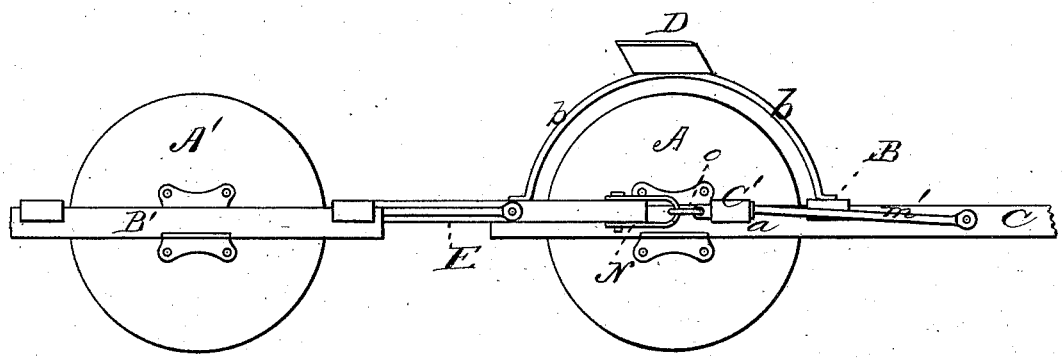

Figure 1 of the drawings is a representation of a top view of my improved land-roller; and Fig. 2 is a side view thereof.

This invention has relation to improvements in land-rollers wherein the novelty consists in combining with the forward roller, its frame, and its tongue, a seat adapted to be supported above said roller by means of standards or supports straddling the same, as hereinafter fully described.

It further consists in combining, with the forward roller, its frame, and its tongue, an arm extending out therefrom, and adapted to be removably connected to the reach or tongue of a second roller-frame, by means of which the same is drawn, all as hereinafter fully shown and described.

The object of my invention is to provide means for the free action sidewise of the rear roller, and to allow the two parts to accommodate themselves to the nature of the ground to be leveled, and to further allow the forward roller to be turned within a short space either to the right or left without its coming in contact with the rear one.

In the accompanying drawings, the letter A designates the forward roller, and A′ the rear roller, both of which may be made of iron or some other heavy material. These rollers are journaled in frames B B′ in the usual well-known manner, said frames being preferably of metal. C designates the main draft-tongue, the rear portion of which is bolted to or forms the side of the front roller-frame, as shown at *a*, and C′ designates an arm extending out horizontally therefrom, for a purpose hereinafter explained. D designates the driver's seat. This seat, as shown in the drawings, is supported by means of arched standards *b*, immediately over roller A, and straddling the same, the feet of which are secured to the front and rear horizontal bars *n n′* of the frame of said roller.

Arm C′, above described, is braced to the main tongue thereof by rods *m m′* on each side, and is adapted to be removably connected by means of a clevis, N, and link O, to a reach or second tongue, E, which is connected centrally to the frame B′ of roller A′, thus placing said roller in rear of and slightly overlapping the forward roller above described. The object of this construction is to allow the rear roller to have free motion sidewise, and also to allow both rollers to accommodate themselves to the unevenness of the land to be leveled.

The rear roller can be detached from arm C′, when requisite, by opening the link or coupling. The rear roller having independent action relative to the front one, a short turn may be made without their interfering with each other, and as the pole is attached to or forms a part of the side of the frame of the front roller, and the rear roller overlaps the said front roller, the draft is in the line of the center of the width of the combined frames.

What I claim as new, and desire to secure by Letters Patent, is—

The land-roller having the roller-frame B rigidly attached to one side of the tongue C, and the horizontal lateral arm C′, projecting from the other side of the tongue opposite said frame, in combination with the rear overlapping roller A′, having an independent tongue, E, and clevis connection for attachment to said arm, substantially as specified.

In testimony that I claim the above I have hereunto subscribed my name in the presence of two witnesses.

GEORGE R. KIDDER.

Witnesses:
FRED. R. FROST,
FRANK E. BOWEN.